July 24, 1923.

F. A. KRUSEMARK

CUSHION TIRE

Original Filed Dec. 13, 1920

1,462,760

Inventor
Frederick A. Krusemark
By Davis & Davis
Attorneys

Patented July 24, 1923.

1,462,760

UNITED STATES PATENT OFFICE.

FREDERICK A. KRUSEMARK, OF ROANOKE, VIRGINIA, ASSIGNOR TO K. F. & C. TIRE & RUBBER CORPORATION, OF ROANOKE, VIRGINIA, A CORPORATION OF VIRGINIA.

CUSHION TIRE.

Application filed December 13, 1920, Serial No. 430,438. Renewed December 22, 1922.

*To all whom it may concern:*

Be it known that I, FREDERICK A. KRUSEMARK, a citizen of the United States of America, and a resident of Roanoke, county of Roanoke and State of Virginia, have invented certain new and useful Improvements in Cushion Tires, of which the following is a full and clear specification.

One object of this invention is to provide means for restraining lateral expansion, i. e., bulging, of the tire mass under load to thus increase reaction and consequently make a more lively tire; and a further object is to utilize said anti-bulging means to assist in preventing separation between the tire mass and the usual circumferential bands of cord-fabric embedded in the tire, as more fully hereinafter set forth.

In the drawing—

Figure 1:
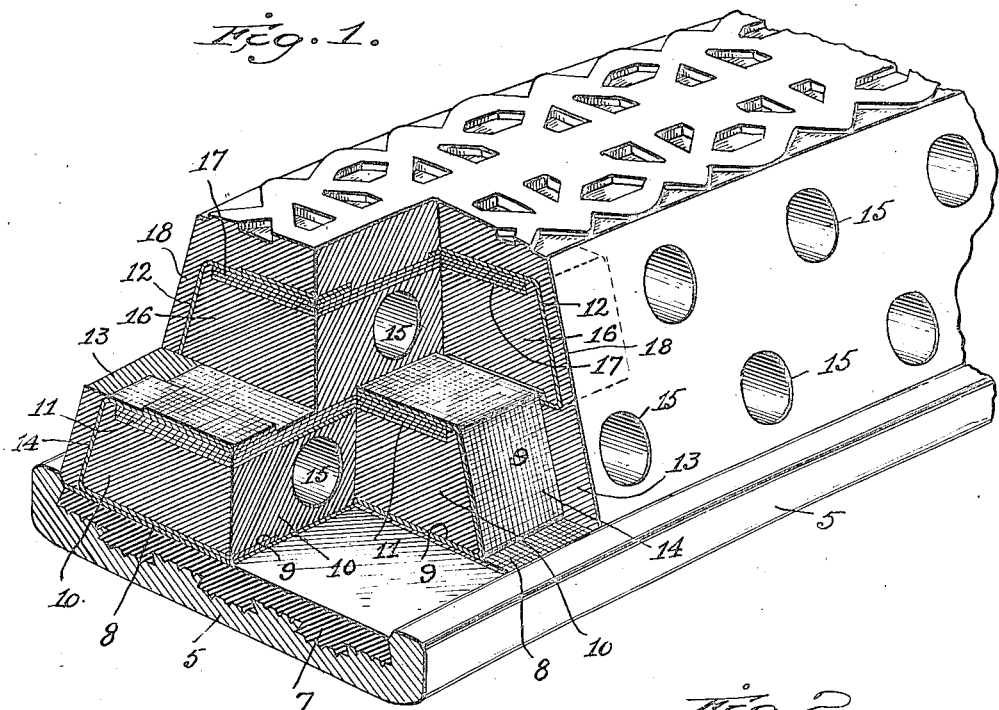
Fig. 1 is a view partly in perspective and partly in section showing the preferred embodiment of my invention.
Figure 2:
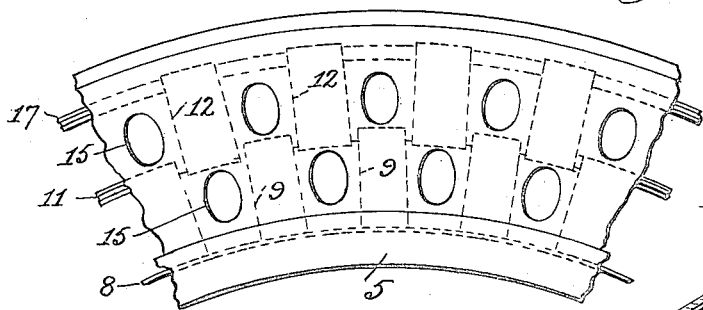
Fig. 2 is a side elevation thereof.

In the drawing annexed, 5 represents the usual tire-rim between whose flanges is embedded the usual hard rubber tire mass 7. Upon this hard rubber mass 7, one or more cord-fabric bands 8 may be wrapped, but these are not essential in this type of tire. Upon this circumferential band 8 or directly on the rubber 7 is placed a series of transverse bands 9 of cord-fabric of the usual kind, consisting of closely-spaced cords running longitudinally of the strip and held together, as usual with this type of fabric, by light cross-threads. When these bands are first laid across the rubber mass 7, the ends are allowed to hang down over the edges of the rim. The usual tackiness of the bands holds them in place on the fabric-bands 8. These bands 9 are equally spaced apart around the tire. Then what might be called the first layer or zone 10 of the tire is put in place, this being done preferably by a series of blocks of rubber extending nearly across the rim and having their side edges stuck together and their bottom faces stuck to the fabric-strips 9 and the hard mass 7 or fabric 8, if this be used, sufficiently tight to hold the blocks in place as they are built up on the tire in the circumferential progression. After this layer of rubber blocks is put in position, another series of transverse bands 12, like bands 9, is put in place, this second series alternating with series 9 all the way around the tire, their loose ends being allowed to hang down over the edges of the rim, as with bands 9; while they are being positioned progressively around the tire. After the transverse bands are thus placed around the tire, their dangling end-portions are then folded over temporarily upon the blocks; then the side faces of the tire are built out to come even with the flanges of the rim by placing pieces of rubber 13 along the side walls against the parts 14 of the bands 9, these parts 14 being substantially parallel with the outer, inclined, side faces of the tire. Then a metal mold-ring is placed on the rim of the tire, substantially in the manner disclosed in my application filed herewith and serially numbered 430,437, these rings being each provided with a series of core-pins which form the holes 15 in the tire, the pins extending inwardly about half way through the tire mass so as to meet approximately in the center thereof, so that the resultant holes will extend entirely through the tire mass when the tire is finished. To facilitate the forming of these holes 15, the blocks 10 are grooved along their edges before they are placed on the tire-rim, and the pins on the mold-rings are inserted in these roughly-formed holes.

After the mold-rings carrying the inner series of pins are thus put in place on the rim-flanges, and the loose ends of bands 9 and 12 are thrown outwardly so as to hang loosely over the edges of the rings, a series of circumferential fabric-bands 11 is wrapped, under high tension, around the blocks 10 and the bands 12; and then the loose end-portions of the first series of transverse bands 9 are folded over upon the bands 11 in overlapped relation. Then another series of blocks 16, similar to the blocks 10, is put in place upon the tightly-drawn circumferential bands 11 and upon the overlapped end-portions of the bands 9; then a series of facing pieces 18, similar to the pieces 13, is put in place against the parts of the band-loops 12; then another pair of metal rings carrying core-pins is put in place on the edges of the previously-positioned pin-carrying rings; then another series of circumferential bands 17 is wrapped, under high tension, around the second or outer zone of the tire as formed by the blocks 16; then the dangling end-portions of the bands 12 are folded over upon said circumferential bands in contact therewith so as to be united under the subsequent vulcanization; then the tread-rubber is put in place, and the tire is ready for vulcanization in the usual manner by being enclosed in a mold and subjected to heat, the mold being, of course, so proportioned with respect to the tire mass as to compress the same during vulcanization.

Figure 4:
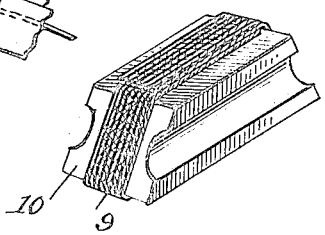
Fig. 4 is a detail view of a modification.

It will be understood that the first or inner series of bands 9 is staggered with reference to the holes 15, so that when each band is folded over in the manner set forth, it envelops a solid mass of rubber and also a short portion of the length of the circumferential fabrics 11, to which latter it is united by the subsequent vulcanization treatment; and it will be seen also that the outer series of bands 12 alternate with the inner series of bands 9 so that they will each be located radially in line with one of the openings 15. It will be understood that it is not absolutely necessary that the bands 9 and 12 shall encompass the circumferential bands, as they may be simply wrapped around each rubber member before it is inserted in place in building up the tire, as shown in diagram in Fig. 4.

Figure 3:
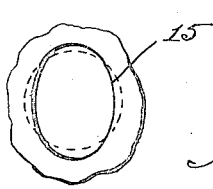
Fig. 3 is a detail view of one of the holes in the tire.

I have described the method of making this tire that is disclosed in my aforesaid copending application, but it will be understood that it may be built up in accordance with any other desirable method without departing from the spirit of my invention. It will be observed also that the holes 15 are elliptical in cross-section, the major diameter being radial. The object of this is to dissipate or prevent localization of action in the rubber mass which forms the wall of the opening. It will be observed that when subjected to load pressure, the openings will have a tendency to become circular, as shown in dotted lines in Fig. 3, in which formation there will be less danger of excessive action in the rubber mass forming the wall of the opening. If any other shaped opening were used, an excessive load would cause less equal distribution of strains in the wall of the opening and thus greatly increase the danger of chafing and pinching on lines across the tire. It is well known that, should the wall of the opening be pinched or subjected to abnormal pressure, the portion thus subjected will soon deteriorate and lose its elasticity and the resultant chafing will cut through the rubber members.

It will be observed that the cord-fabric loops 9 and 12 serve to restrain lateral expansion in the rubber mass under load and thus ensure a quicker reaction and consequently a more lively tire. Thus restraining the lateral expansion under load also tends to prevent separation of the circumferential bands from the tire mass, this being due to the fact that when the tire mass is under load, excessive lateral expansion would tend to separate the rubber mass from the fabric bands, since these bands have very little edgewise elasticity. The cord-loops also bind the rubber mass and circumferential bands together and thus help to take care of lateral as well as traction strains and also to anchor the tire proper more firmly to the base.

The nature and scope of the invention having been thus indicated and its preferred embodiment having been specifically described, what is claimed as new is:

1. In a cushion tire, a series of separated transverse band loops entirely embedded in the tire, each encompassing a substantial part of the rubber mass of the tire.

2. In a cushion tire, a series of transverse band loops embedded in the tire, each encompassing a substantial part of the rubber mass of the tire, said band loops consisting of cords extending transversely of the tire at their outer and inner sides and approximately parallel with the side faces of the tire at their ends.

3. In a cushion tire, a series of transverse band loops embedded in the tire, each encompassing a substantial part of the rubber mass of the tire, circumferential fabric-bands being embedded in the tire in such manner as to have adhesive contact therewith.

4. In a cushion tire consisting of a rubber mass and a rim, a series of pieces of cord-fabric embedded in the tire at each side approximately parallel with the side faces of the tire and having inwardly-extending extensions embedded in the tire mass.

5. In a cushion tire consisting of a rubber mass and a rim, a series of pieces of cord-fabric embedded in the tire at each side approximately parallel with the side faces of the tire and having inwardly-extending extensions embedded in the tire mass, and circumferential fabric bands having adhesive contact with said inwardly-extending portions of said cord-fabric.

6. In a cushion tire, a rim and a rubber mass affixed thereto, and having embedded in it two separated circumferential fabric bands and also an outer series of transverse fabric loops, and also an inner series of similar transverse fabric loops, the outer series of loops being staggered with reference to the inner series and each loop having one of its transverse portions in adhesive contact with the inner one of said circumferential fabric bands.

7. A cushion tire embodying a rim and a tire mass carried thereby and having embedded in it circumferential fabric bands and also transverse fabric bands, these transverse bands having portions which lie near the surface of the side faces of the tire and approximately parallel therewith.

8. In a cushion tire, a rim and a tire mass affixed thereto and having an outer series of transverse air-passages as well as an inner series of transverse air-passages, the passages of the outer series being staggered with reference to the passages of the inner series, an outer series of transverse cord-fabric loops embedded in the tire, and an inner series of transverse fabric loops, the outer series of loops alternating with the passages of the outer series and the inner series of loops alternating with the inner series of passages.

In testimony whereof I hereunto affix my signature.

FREDERICK A. KRUSEMARK.